United States Patent Office 2,695,671
Patented Nov. 30, 1954

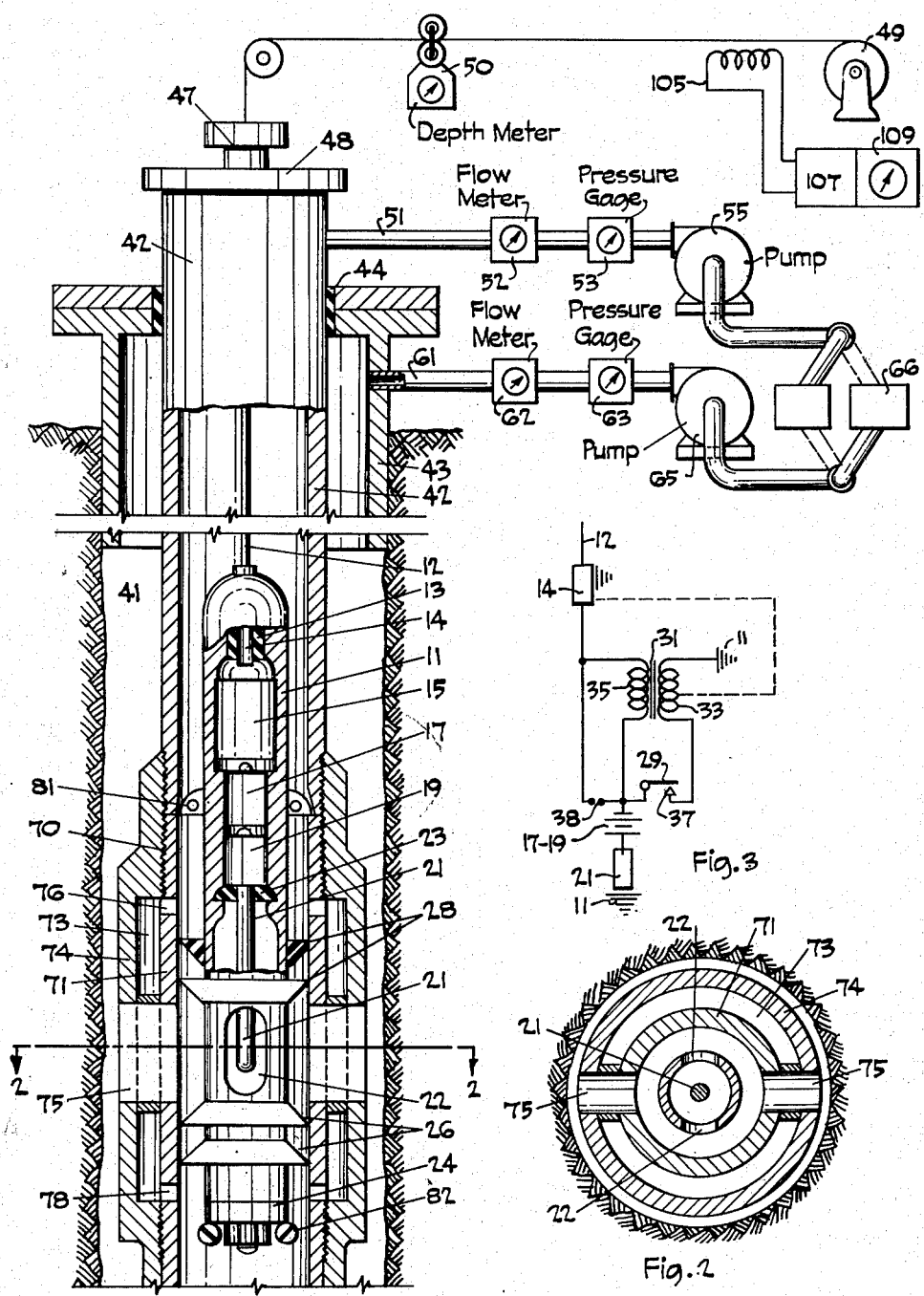

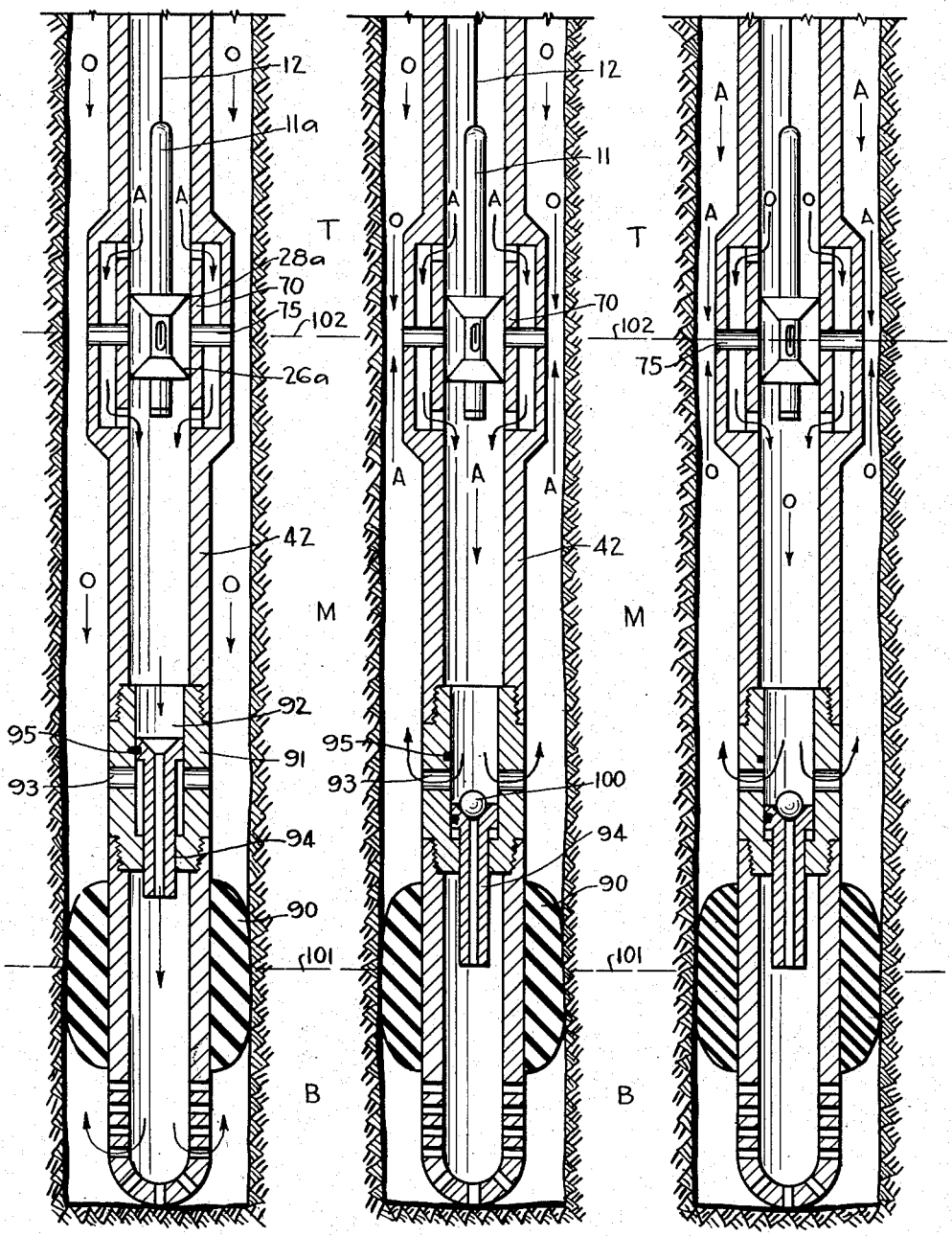

2,695,671

WELL FLUID MEASUREMENT

Benson M. Kingston, Breckenridge, Tex., assignor to The Independent Eastern Torpedo Company, a corporation of Ohio, and Shell Development Company, a corporation of Delaware Application May 6, 1949, Serial No. 91,687

4 Claims. (Cl. 166—67)

This invention pertains to the treatment of underground formations traversed by a well or borehole, to the measurement of liquid flows and levels in said borehole, and to apparatus for effecting such treatment and measurements.

In exploiting and treating petroleum wells, it is essential to have accurate information as to the nature of the fluids standing therein, the points of entry of formation fluids into the borehole, the flow rates of the well or treating fluids, the levels of the interfaces between different well or treating fluids, the permeabilities of various layers traversed by a well, etc.

In effecting measurements necessary to obtain this information, use may be made of differences in conductivity of electrolytic liquids, such as acids or brines, and non-electrolytic liquids such as oil, etc.

A Patent No. 2,473,713, granted June 21, 1949, of which the present application is a continuation-in-part, discloses a system for surveying or determining fluid conditions in a well by means of electrodes lowered thereinto in a suitable housing, together with a source of direct current and with means for changing a direct current passing between said electrodes to a high tension alternating or oscillating current, the resulting electromagnetic signals being transmitted to the surface through the cable supporting the housing.

It is an object of the present invention to provide further improvements in the system of said prior application Serial No. 671,044, now Patent No. 2,473,713, said improvements relating more particularly to a tubular seating unit or nipple for the electrode housing, said tubular unit being adapted to be connected into a tubing string and having an unobstructed bore therethrough, whereby an unimpeded fluid flow may be directed at any desired time through said tubular unit, and any suitable well tools or measuring instruments may be passed therethrough to a point at a lower level in the well.

It is also an object of this invention to provide an improved method whereby a plurality of vertically spaced zones or formations can be consecutively and/or selectively acidized or subjected to any other treatment involving the injection of a fluid into a well.

These and other objects of this invention will be understood from the following description taken with reference to the attached drawings, wherein:

Fig. 1 is a schematic view, partly in cross-section, of the system of the present invention;

Fig. 2 is a horizontal cross-section view taken along line 2—2 of Fig. 1;

Fig. 3 is a diagrammatic connection circuit of the signalling system used in accordance with the present invention;

Figs. 4, 5 and 6 are diagrams illustrating various steps in the acidizing method of the present invention.

Referring to Fig. 1, the detector or exploratory element of the present invention comprises a tubular metallic housing 11 attached to the end of an insulated conductor cable 12. The housing 11 may have a length such as from 3 to 5 feet or more, and a diameter such as from 1 to 2 inches or more. The insulated conductor cable passes into the housing through a fluid-tight insulating upper bushing 13 and is electrically connected to a connector member 14, which is in turn electrically connected to a terminal of a transmitting or oscillatory circuit held in a compartment 15.

The operating current for the transmitting circuit is supplied from one of the terminals of a source of E. M. F. comprising, for example, a desired number of dry cells, such as illustrated at 17 and 19. The other terminal of the dry cell battery is connected to an electrode 21, passing through a fluid-tight insulating lower bushing 23. The space within the tubular housing 11 below the bushing 23 is open to the fluid outside through a plurality of windows 22, the lower end of the tubular housing 11 being however closed, as for example, by a lid member 24.

Carried outwardly by the housing 11 between the lower end thereof and the window 22 are one or more lower packing or cup members 26. Carried outwardly by the housing 11 above the window 22 are one or more upper packing or cup members 28, similar to members 26 and arranged in general symmetrically therewith with regard to the window 22.

The electrical circuit of the signalling or transmitter system held in compartment 15 is shown in Fig. 3. As stated above, one of the terminals of the battery 17 and 19 is connected to the electrode 21, while the other terminal is connected to a vibrator 29 of a spark coil arrangement held in compartment 15. The vibrator 29 is actuated, in well known fashion, by an induction coil comprising a core 31, a low-tension primary winding 33 and a high-tension secondary winding 35.

One of the terminals of the primary winding 33 is connected to a contact point 37 associated with the vibrator 29. The other terminal of the primary winding is grounded to the housing 11 of the detector. It will thus be seen that the electrode 21 and housing 11 form two electrodes connected to the circuit of battery 17—19 and separated from each other by the liquid entering the lower part of the housing 11 through the windows 22.

The secondary winding 35 and the spark gap 38 connected across it form a sending circuit connected to the conductor cable 12 which serves as a transmitting antenna.

In Fig. 1, the housing 11 is shown within a tubing string 42, which extends within one or more concentric strings of casing such as shown at 43, in a well 41. A fluidtight closure is provided about the tubing 42 at the casing head, as indicated at 44.

The cable 12 passes through a lubricator device 47 at the upper closure member 48 of the tubing 42, and is wound on a reel 49. A depth meter 50 may be used to indicate the exact level at any moment of the housing 11 within the well.

The tubing 42 is in communication with a pump 55 through a pipe 51, provided with a flow meter 52 and a pressure gage 53. The casing 43 is similarly in communication with a pump 65 through a pipe 61, flow meter 62 and pressure gage 63. Either of the pumps 55 and 65 can selectively supply the well with a liquid of any desired type, such as acid, brine, oil, aqueous or oil-base drilling fluid, etc., from a reservoir or a plurality of reservoirs diagrammatically shown at 66.

Connected by suitable adapter means into the tubing string 42 at any desired point intermediate the upper and lower ends thereof is a seating unit or nipple 70, having an inner annular wall 71 and an outer annular wall 74 connected together by any suitable means such as screw-threads, welding, etc., in such a manner as to form therebetween a closed annular chamber or passage 73.

Passing radially through the members 71, 74 and the chamber 73 therebetween is a plurality of transverse tubular windows or radial conduits 75, of which two are shown for illustration purposes in Figs. 1 and 2, said windows being in communication between the interior of the tubular member 70 or the string 42 and the space within the borehole outside said string.

Passing radially through the inner member 71 above the windows 75 is a plurality of ports 76 in communication between the interior of the tubular member 70 and the annular chamber or passage 73. Similar ports 78 are located below the windows 75.

As stated hereinabove, the electrode housing 11 carries a plurality of outward cups or packing elements 26 and 28. These cups are of such diameter as to form a substantially fluid-impervious seal between the housing 11 and the seating nipple 70 which may have approximately the same inner diameter as the tubing string 42. Cups 28 are formed and their lips are arranged so as to prevent a downward axial fluid flow in the tubing 42, while the cups 26 are arranged so as to prevent an upward axial fluid flow in said tubing.

It will thus be seen that if the housing 11 is positioned within the seating nipple of the tubing string 42 with the windows 22 substantially in register with the windows 75, it is possible to pump a liquid of a desired type for example, an acid, through the tubing string 42 from the surface down to a point below the seating nipple 70 without said acid coming into contact with the electrode 21. Specifically the flow will take place down the tubing 42, through ports 76 down the annular space or passage 73, around the tubular windows 75 to the lower portion of said space 73, and back inside the tubing 42 through ports 78, the cups 28 and 26 keeping said acid out of contact with the electrode 21, which remains immersed in the fluid standing in the borehole and having access to said electrode through windows 75 and 22.

In order to anchor the housing 11 in the position described, it may be provided with outward stop members 81 adapted to engage suitable shoulder or joint means carried by the seating nipple, said stop, shoulder or pin means being of such shape and dimensions as not to interfere in any appreciable way with the circulation of the fluid from the surface to the ports 76. It is likewise possible to provide the seating nipple with pins 82 adapted to engage the lower end of the housing 11 to anchor said housing at the desired level, or the present apparatus may be provided with both stop members 81 and pins 82, as shown in the drawing.

The present apparatus can be used for purposes of permeability surveys, level measurements, water intrusion determinations, acidizing, etc., in a manner similar to that described in the Patent No. 2,473,713, referred to hereinabove, the basic advantage of the present apparatus residing in the fact that the present tubular string and seating nipple 70 form an unobstructed channel for fluid flow at all times to any point at any depth in the well thereinbelow, and that by withdrawing when desired the housing 11 from the tubular string 42, an unobstructed axial channel is obtained whereby either fluids or well tools of suitable diameter may be conveyed to any depth within the well for any purpose desired.

The advantages of the present apparatus will be clearly seen from the following illustrative description of an acidizing method whereby several zones traversed by a well may be consecutively subjected to acidizing treatment.

Figs. 4, 5 and 6 diagrammatically represent a well traversing a top zone T, a middle zone M and a bottom zone B, all of which it is desired to acidize. Due to various factors, such as differences of permeability, permissible pump pressures, etc., it is necessary to acidize said zones one by one.

For this purpose, the tubing string 42 is installed in the well with the seating nipple 70 connected thereinto at the desired level, preferably at the interval between the top and the middle zones and approximately at the level of the bottom of the top zone.

A packer 90 of any suitable construction is set in the annular space between the string 42 and the walls of the borehole at another desired level, preferably at the interval between the middle and the bottom zones and approximately at the level of the bottom of the middle zone.

Connected into the string 42 slightly above the packer 90 is a tubular packer tool generally designated at 91 and comprising blank-off and standing valve elements. The tool 91 may be of any suitable construction, an illustrative example being diagrammatically shown in Figs. 4, 5 and 6 as having an axial bore 92 in communication with the outside of the string by means of radial windows 93. Mounted for sliding motion in the bore 92 is a second tubular member 94, which is held in place by a shear pin 95 in such a position as to mask or blank off the radial windows 93 while permitting an axial flow through the tool.

When it is desired to effect a selective acidizing of the lower zone B, the electrode housing 11 of Fig. 1 is positioned in the seating nipple 70, and acid is delivered to the bottom of the well below the packer 90 through the tubing string 42 by means of the pump 55, as indicated by the arrows A, while oil or another non-electrolytic liquid is being pumped down the annular space between the tubing and the walls of the borehole, as indicated by arrows O, to maintain the packer 90 firmly in place and to prevent any upward leakage of acid past it.

Since the object of using the housing 11 during this phase of the operations is merely to prevent the intermixing of the acid and the oil through the windows 75, the electrode housing 11 may be, if desired, replaced by a tool constructionally similar thereto and comprising a mandrel 11a and cups 26a and 28a, but not carrying any electrical equipment.

When the lower zone B has been properly acidized, and it is desired to acidize the middle zone M, the tool 11 or 11a is withdrawn, a ball or plug 100 is dropped into the tubing 42, the electrode housing 11 is positioned in the seating nipple, and the pumps are started operating as before, this phase of operations being illustrated in Fig. 5.

The ball 100 closes the axial passage through the sliding tubular member 94, and the pressure of the acid shears the pin 95 and depresses said member 94 downwards so as to unmask the windows 93, and to cause a radial flow of the acid therethrough.

The acid fills the annular space above the packer 90. Since it is desired to treat the zone M throughout the limits indicated by the dotted lines 101 and 102, the pressure of the acid delivered by pump 55 may be permitted to exceed that of the oil delivered by pump 65 until the interface between said two liquids has been gradually displaced upwards to the level of the line 102, the arrival of the acid to said level being indicated at the surface by the detector device in housing 11.

It will be seen from reference to Figs. 1 and 3 that as long as the annular space around the string 42 is filled with mineral oil or other non-electrolytic liquid, and electrode 21 is immersed in said liquid, no current will flow in the circuit of Fig. 3, the electrode 21 being insulated from the housing 11. Upon reaching the level 102, however, the acid will fill the space surrounding the electrode 21 within the lower portion of housing 11, reaching said space through windows 75 and 22. A direct current will thus flow in the circuit of the primary winding 33. The action of the vibrator 29 serves, in well known manner, to interrupt periodically this direct current, thus producing a high tension interrupted or alternating current or oscillation in the circuit of the secondary winding 35. The points of the spark gap 38 are adjusted so that when the voltage in the secondary circuit reaches or approaches its peak, a spark discharge takes place therebetween. This spark discharge causes the cable 12 to radiate an electromagnetic wave, thereby serving as a sending or transmitting antenna.

This electromagnetic radiation is picked up by a receiving coil or antenna 105, inductively coupled to the cable 12 at the surface, and is relayed, if desired, after suitable amplification in unit 107, to an indicating unit 109, which may be of any desired type, such as an auditory device, a recorder, etc.

As the acid reaches the level indicated by line 102, and the contact of electrode 21 with the acid is indicated by the response of the device 109, the pump 65 is started or its operation is intensified so that the pressure of the oil delivered thereby is equal to the pressure of the acid delivered by pump 55. The acid is thus not permitted to rise to a level higher than that of line 102, any additional amounts of said acid delivered by the pump being forced into the formation M between the levels 101 and 102.

When it is desired to acidize the upper zone T, which operation is illustrated in Fig. 6, the procedure is substantially similar to that described hereinabove, excepting that in this case pump 55 is connected so as to deliver oil within the tubular string 42, while pump 65 is connected to deliver acid down the annular space about said string. The acid-oil interface is still maintained at level 102, the acid forming now the upper layer while oil forms the lower layer. Since the specific density of the acid is normally greater than that of the oil and the acid may therefore have a tendency to settle by gravity below the level 102, it may be sometimes desirable to use a relatively heavy and viscous material, such as an oil base mud instead of the oil in these operations.

I claim as my invention:

1. Apparatus for use in treating wells with fluids, comprising an elongated tubular member, coupling means at both ends thereof for connecting said tubular member into a tubing string, said member having an inner annular wall defining the axial bore through said member, an outer annular wall connected to said coupling means and spaced from said inner wall to form a closed annular chamber surrounding said axial bore, radial conduit means in communication between said axial bore and the outside of said member extending through said inner and outer walls and the chamber therebetween, and radial port means through said inner wall above and below said radial conduit means in communication between said axial bore and said annular chamber.

2. Apparatus for use in treating wells with fluids, comprising, in combination, an elongated tubular member, coupling means at both ends thereof for connecting said tubular member into a tubing string, said member having an inner annular wall defining the axial bore through said member, an outer annular wall connected to said coupling means and spaced from said inner wall to form a closed annular chamber surrounding said axial bore, radial conduit means in communication between said axial bore and the outside of said member extending through said inner and outer walls and the chamber therebetween, and radial port means through said inner wall above and below said radial conduit means in communication between said axial bore and said annular chamber, a cylindrical mandrel member adapted to be positioned within the bore of the tubular member, spaced packing means carried by said mandrel member to form a fluid-tight seal with the walls of said bore on both sides of said radial conduit means between said radial conduit and said radial port means, the space within said bore thus sealed off from the fluid in said tubing string being in communication with the well fluid outside said tubular member through said radial conduit means.

3. Apparatus for use in treating wells with fluids, comprising, in combination, an elongated tubular member, coupling means at both ends thereof for connecting said tubular member into a tubing string, said member having an inner annular wall defining the axial bore through said member, an outer annular wall connected to said coupling means and spaced from said inner wall to form a closed annular chamber surrounding said axial bore, radial conduit means in communication between said axial bore and the outside of said member extending through said inner and outer walls and the chamber therebetween, and radial port means through said inner wall above and below said radial conduit means in communication between said axial bore and said annular chamber, an axially elongated housing adapted to be positioned within the bore of said tubular member, axially spaced first and second packing means exteriorly carried by said housing to form a fluid-tight seal with the walls of said bore on both sides of said radial conduit means between said radial conduit and said radial port means, the space within said bore thus sealed off from the fluid in said tubing string being in communication with the well fluid outside said tubular member through said radial conduit means, and electrode means carried by said housing intermediate said spaced packing means in contact with the fluid in said sealed-off space to determine the electrolytic conductivity properties of said fluid.

4. Apparatus for use in treating wells with fluids, comprising, in combination, an elongated tubular member, coupling means at both ends thereof for connecting said tubular member into a tubing string, said member having an inner annular wall defining the axial bore through said member, an outer annular wall connected to said coupling means and spaced from said inner wall to form a closed annular chamber surrounding said axial bore, radial conduit means in communication between said axial bore and the outside of said member extending through said inner and outer walls and the chamber therebetween, and radial port means through said inner wall above and below said radial conduit means in communication between said axial bore and said annular chamber, an axially elongated housing adapted to be positioned within the bore of said tubular member, axially spaced first and second packing means exteriorly carried by said housing to form a fluid-tight seal with the walls of said bore on both sides of said radial conduit means between said radial conduit and said radial port means, the space within said bore thus sealed off from the fluid in said tubing string being in communication with the well fluid outside said tubular member through said radial conduit means, electrode means carried by said housing intermediate said spaced packing means in contact with the fluid in said sealed-off space, means comprising an insulated conductor cable extending from the surface to said housing and a source of current in said housing in circuit with said electrodes for passing a direct current between said electrodes through said fluid, means in said housing for converting said direct current into electrical oscillations, and meter means at the surface responsive to the oscillations transmitted thereto through said cable for indicating said oscillations.

References Cited in the file of this patent

UNITED STATES PATENTS

| Number | Name | Date |
|---|---|---|
| 1,808,958 | Lane | June 9, 1931 |
| 2,187,430 | Baker | Jan. 16, 1940 |
| 2,376,878 | Lehnhard | May 29, 1945 |
| 2,413,435 | Courter | Dec. 31, 1946 |
| 2,473,713 | Kingston et al. | June 21, 1949 |